United States Patent
Suzuki et al.

(10) Patent No.: US 8,447,371 B2
(45) Date of Patent: May 21, 2013

(54) MOBILE TERMINAL DEVICE

(75) Inventors: Takashi Suzuki, Kawasaki (JP); Takeshi Komuro, Kawasaki (JP); Kouki Murakami, Kawasaki (JP); Kurumi Harada, Kawasaki (JP); Hiroshi Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/212,707

(22) Filed: Aug. 18, 2011

(65) Prior Publication Data

US 2012/0058806 A1 Mar. 8, 2012

(30) Foreign Application Priority Data

Sep. 7, 2010 (JP) .................................. 2010-200296

(51) Int. Cl.
*H04M 1/00* (2006.01)
(52) U.S. Cl.
USPC .................................... 455/575.3; 455/550.1

(58) Field of Classification Search
USPC ...................... 455/575.1–575.6, 550.1, 556.1
See application file for complete search history.

(56) References Cited

U.S. PATENT DOCUMENTS

2007/0263343 A1* 11/2007 Takasaki et al. .............. 361/600
2008/0146296 A1 6/2008 Sakashita et al.

FOREIGN PATENT DOCUMENTS

JP 2007-194872 A 8/2007
JP 2008-153861 A 7/2008

* cited by examiner

*Primary Examiner* — Michael Faragalla
(74) *Attorney, Agent, or Firm* — Westerman, Hattori, Daniels & Adrian, LLP

(57) ABSTRACT

A mobile terminal device with a first case including a rotation base portion having a first axis of rotation parallel to a side of the first case, a second case openable and closable relative to the first case by rotating the second case about the first axis of rotation, and a supporting portion attached to the second case, wherein the supporting portion includes a rotation portion integral therewith and rotatable relative to the rotation base portion about the first axis of rotation and covers at least a part of the rotation base portion.

5 Claims, 5 Drawing Sheets

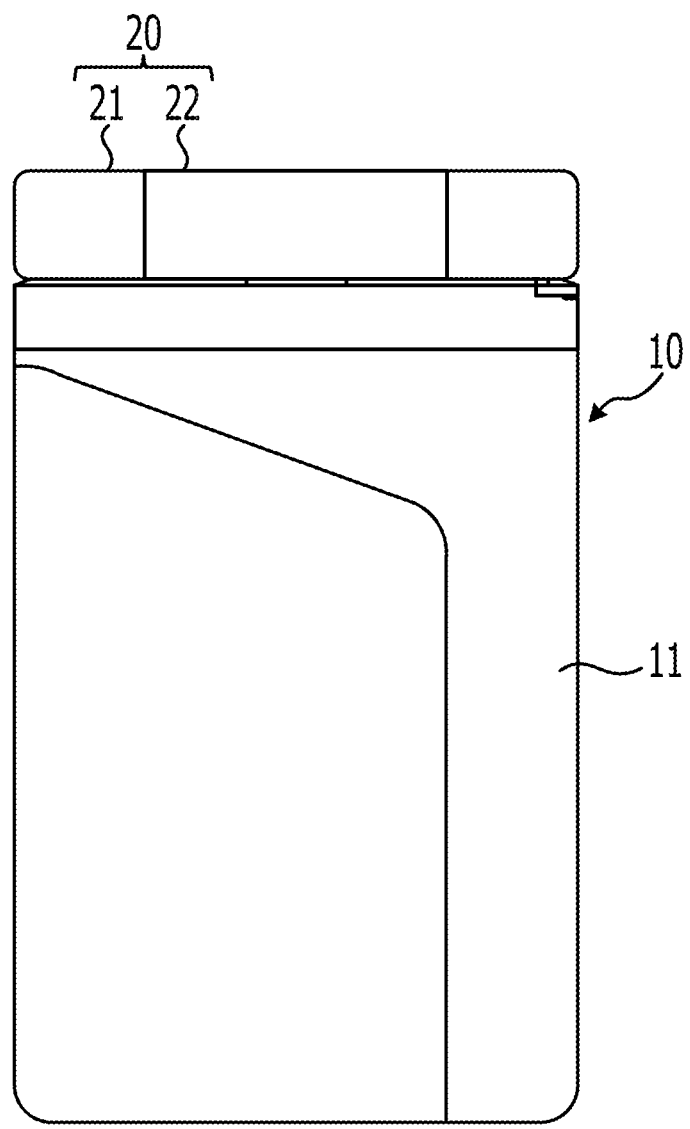

MOBILE TERMINAL DEVICE

CROSS-REFERENCE TO RELATED APPLICATIONS

This application is based upon and claims the benefit of priority from the prior Japanese Patent Application No. 2010-200296 filed on Sep. 7, 2010, the entire contents of which are incorporated herein by reference.

FIELD

The embodiment discussed herein relates to a mobile terminal device.

BACKGROUND

In recent years, mobile terminal devices such as mobile phones have adopted folding structure or the like to improve their portability. Dividing a case of a mobile terminal device into two and connecting the resulting two cases with a hinge openable and closable relative to each other gives the mobile terminal device both convenience when in use and portability when not in use.

Nowadays, mobile terminal devices have many functions, and mobile terminal devices with a camera function and a broadcast single receiver function for receiving 1Seg, ATSC-M/H or similar broadcast signals are increasing. Some of such mobile terminal devices have, in view of user-friendliness, a display-side case having a display portion and are rotatable to various angles. For example, a mobile terminal device illustrated in FIG. 5 has a rotation biaxial hinge structure.

FIG. 5 is a plan view illustrating a case and a hinge portion of a mobile terminal device. In the mobile terminal device illustrated in FIG. 5, a display-side case 10 is openably and closably connected to an operation-side case having operation portions such as keys (not illustrated) by a hinge portion 20. Rotation base portions 21 forming the hinge portion 20 are fixed to the operation-side case (not illustrated). A rotation portion 22 forming the hinge portion 20 rotates relative to the rotation base portions 21 about an axis of rotation parallel to the lateral direction of the display-side case 10. With this rotation, the display-side case 10 supported by the rotation portion 22 opens and closes relative to the operation-side case (not illustrated).

The hinge portion 20 has a rotation biaxial hinge, and therefore the display-side case 10 is supported by the rotation portion 22 rotatably about an axis of rotation parallel to the longitudinal direction. By rotating the display-side case 10 about the axis of rotation parallel to the longitudinal direction, the display portion provided on the back of the outer panel 11 illustrated in FIG. 5 may be exposed on the outside. Reversing the display-side case 10 with the display-side case 10 and the operation-side case (not illustrated) in the open state and then bringing the display-side case 10 and the operation-side case into the closed state enables the user to look at a screen displayed on the display portion in the closed state.

There are other mobile terminal devices that have a structure of a cycloid type, a swing type, or the like and in which a case divided into two are openable and closable and the display-side case is rotatable. For example, in a mobile terminal device disclosed in Japanese Laid-open Patent Publication No. 2008-153861, the display-side case is rotatable about an axis of rotation parallel to the thickness direction of the mobile terminal device. Therefore, the operation in a state where the display-side case and the operation-side case are open may be facilitated, and the visibility of the display portion may be improved.

However, in a mobile terminal device wherein one of the cases is rotatable, the mechanism for rotating the case is complex, and therefore the improvement of aesthetic properties is sometimes limited. For example, the mobile terminal device having a rotation biaxial hinge structure illustrated in FIG. 5 has such an appearance that the display-side case 10 and the hinge portion 20 are completely separated. For this reason, the gap between the display-side case 10 and the hinge portion 20 is noticeable, and the aesthetic properties of the mobile terminal device are marred.

Specifically, the rotation base portions 21 are fixed to the operation-side case (not illustrated), whereas the display-side case 10 is attached rotatably about two axes, and therefore the gap between the rotation base portions 21 and the display-side case 10 tends to be large.

SUMMARY

According to an aspect of the invention, a mobile terminal device with a first case including a rotation base portion having a first axis of rotation parallel to a side of the first case, a second case openable and closable relative to the first case by rotating the second case about the first axis of rotation, and a supporting portion attached to the second case, wherein the supporting portion includes a rotation portion integral therewith and rotatable relative to the rotation base portion about the first axis of rotation and covers at least a part of the rotation base portion.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a plan view illustrating a case and a hinge portion of a mobile terminal device.

DESCRIPTION OF EMBODIMENTS

An embodiment of a mobile terminal device of the present invention will be described with reference to the drawings. The present invention is not limited by this embodiment.

Figure 1:
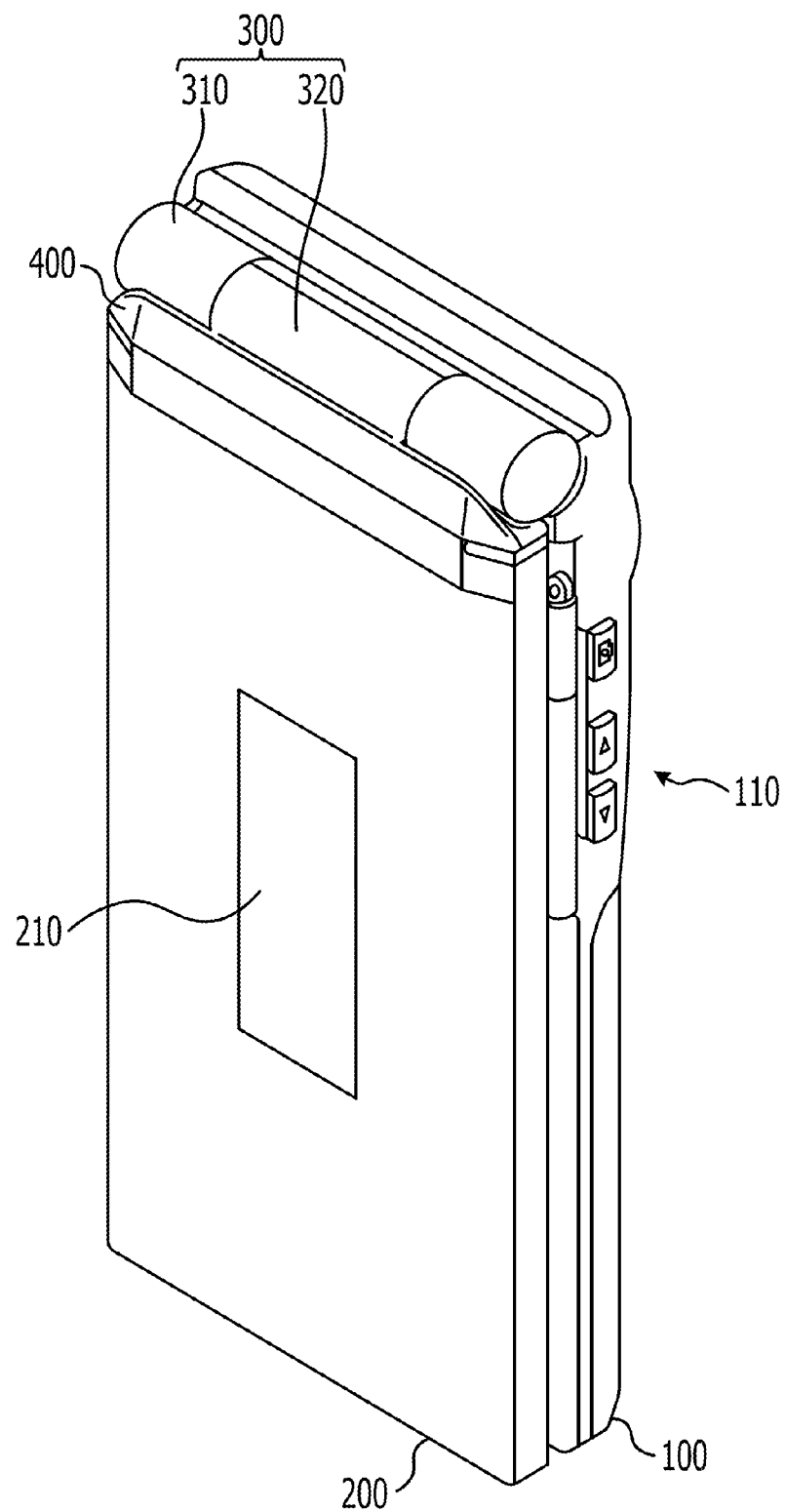
FIG. 1 is a perspective view illustrating the appearance of a mobile terminal device according to an embodiment.

FIG. 1 is a perspective view illustrating the appearance of a mobile terminal device according to an embodiment. The mobile terminal device illustrated in FIG. 1 has an operation-side case 100 and a display-side case 200. The operation-side case 100 and the display-side case 200 are connected by a hinge portion 300 and are thereby openable and closable relative to each other. FIG. 1 illustrates a state where the operation-side case 100 and the display-side case 200 are closed relative to each other.

The operation-side case 100 has side keys 110 for operating the mobile terminal device. The operation-side case 100 has numerical keys (not illustrated) on the surface thereof facing the display-side case 200 in the closed state. The user may use various functions of the mobile terminal device by pressing the side keys 110 and the numerical keys. For example, the user may make a call by entering a desired telephone number and may display a broadcast screen on the display-side case 200 by pressing keys for watching broadcast signals such as 1Seg, ATSC-M/H or similar.

The display-side case 200 has a back liquid crystal panel 210 that displays various screens. The display-side case 200 has a main liquid crystal panel (not illustrated) and so forth on the surface thereof facing the operation-side case 100 in the closed state. Various screens are displayed on the back liquid crystal panel 210 and the main liquid crystal panel by operating the operation-side case 100. For example, when a call is received, a call alert message is displayed on the back liquid crystal panel 210, and when an operation for watching broadcast signals is performed, a broadcast signal screen is displayed on the main liquid crystal panel.

The hinge portion 300 has a rotation biaxial hinge and connects the operation-side case 100 and the display-side case 200 so as to be openable and closable relative to each other and allows the display-side case 200 to be rotated about an axis of rotation perpendicular to the axis of rotation at the time of opening and closing. Specifically, the hinge portion 300 has a rotation base portion 310 and a rotation portion 320.

The rotation base portions 310, being spaced apart from each other, are fixed to both ends of a short side of the operation-side case 100 and each have a substantially cylindrical shape. The substantially cylindrical shape of the rotation base portions 310 is formed so as to surround an axis of rotation parallel to the lateral direction of the operation-side case 100 and the display-side case 200.

The rotation portion 320 is interposed between the rotation base portions 310 and has a substantially cylindrical shape. The rotation portion 320 surrounds the axis of rotation parallel to the lateral direction of the operation-side case 100 and the display-side case 200 and is rotatable about this axis of rotation relative to the rotation base portions 310. The rotation portion 320 is formed integrally with a supporting portion 400 supporting the display-side case 200, and therefore rotates together with the display-side case 200, thereby causing the operation-side case 100 and the display-side case 200 to open and close relative to each other.

The supporting portion 400 formed integrally with the rotation portion 320 supports the display-side case 200 rotatably about an axis of rotation parallel to the longitudinal direction of the display-side case 200. The supporting portion 400 allows the display-side case 200 to rotate about the axis of rotation penetrating the display-side case 200 in the longitudinal direction so that the back liquid crystal panel 210 may be exposed on the outside and the main liquid crystal panel (not illustrated) may be exposed on the outside.

The operation-side case 100 and the display-side case 200 are openable and closable relative each other. The display-side case 200 is rotatable about the axis of rotation perpendicular to the axis of rotation at the time of opening and closing.

The supporting portion 400 is formed integrally with the rotation portion 320 and rotates together with the rotation portion 320 about the axis of rotation parallel to the lateral direction of the operation-side case 100 and the display-side case 200. The supporting portion 400 is connected to the display-side case 200 by the axis of rotation parallel to the longitudinal direction of the display-side case 200 and supports the display-side case 200 rotatably about the axis of rotation parallel to the longitudinal direction. Specifically, the supporting portion 400 supports the display-side case 200 at an end thereof having substantially the same width as the width in the lateral direction of the display-side case 200. The appearance of the supporting portion 400 and the display-side case 200 gives a totally uninterrupted impression.

The supporting portion 400 covers the border between the rotation base portions 310 and the display-side case 200. By making the width of the supporting portion 400 substantially the same as the width in the lateral direction of the display-side case 200 and by forming the supporting portion 400 integrally with the rotation portion 320 such that the supporting portion 400 overlaps the rotation portion 320, the supporting portion 400 hides the border between the hinge portion 300 and the display-side case 200. For this reason, the gap formed between the rotation base portions 310 and the display-side case 200 is invisible, and the aesthetic properties of the mobile terminal device improve.

Figure 2:
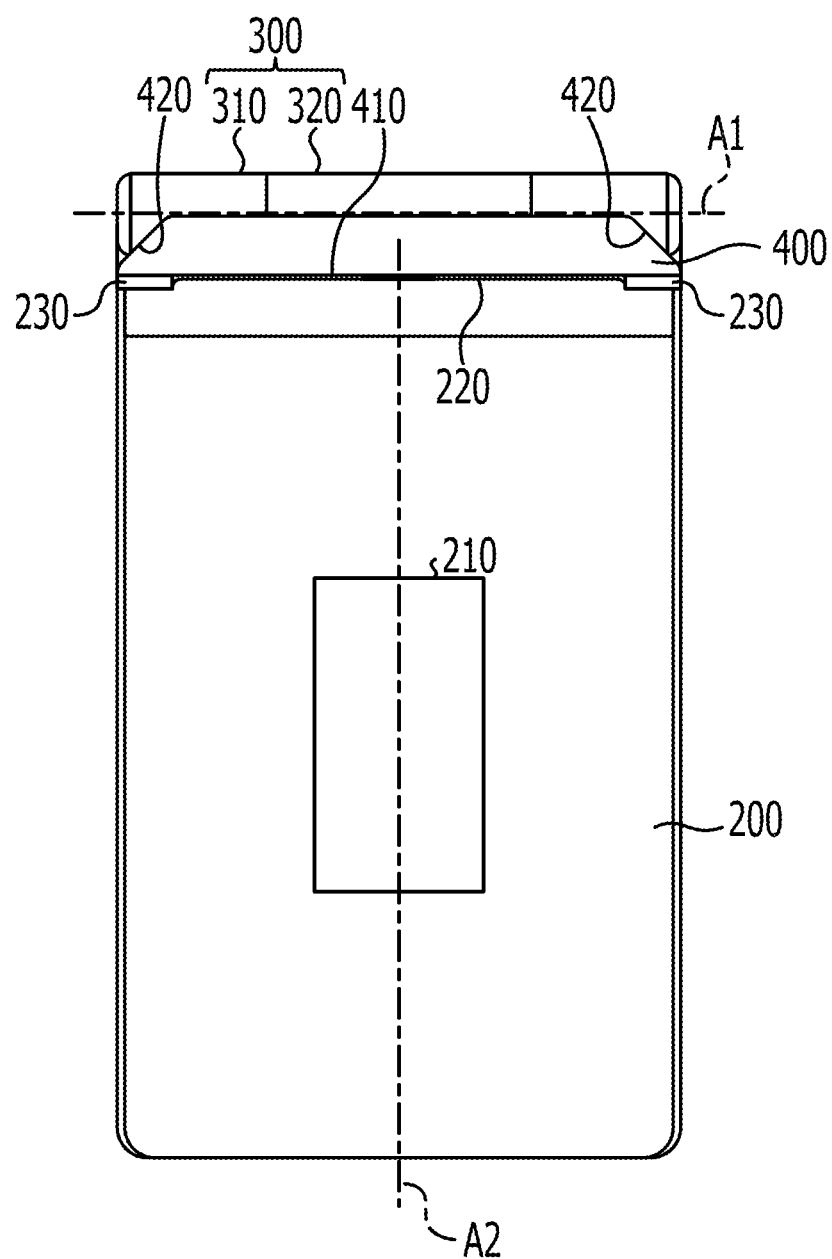
FIG. 2 is a plan view illustrating the appearance of the mobile terminal device according to the embodiment.

FIG. 2 is a plan view illustrating the appearance of the mobile terminal device according to this embodiment. The hinge portion 300 makes the display-side case 200 openable and closable relative to the operation-side case 100 about an axis A1 of rotation parallel to the lateral direction of the display-side case 200. The display-side case 200 is supported by the supporting portion 400 formed integrally with the rotation portion 320, and is rotatable about an axis A2 of rotation parallel to the longitudinal direction of the display-side case 200. By rotating the display-side case 200 about the axis A2 of rotation, the back liquid crystal panel 210 is exposed on the outside, or the main liquid crystal panel (not illustrated) is exposed on the outside.

An end 410 of the supporting portion 400 has substantially the same width as an end 220 having a short side of the display-side case 200. The end 410 of the supporting portion 400 is connected to the end 220 of the display-side case 200 by the axis A2 of rotation. Supporting pads 230 provided at the end 220 of the display-side case 200 are in contact with the end 410 of the supporting portion 400, and backlash of the display-side case 200 is prevented. In this embodiment, when the display-side case 200 is rotated about the axis A1 of rotation to be opened and closed, the positional relationship between the display-side case 200 and the supporting portion 400 does not change, and therefore the supporting pads 230 are always in contact with the supporting portion 400. As a result, backlash of the display-side case 200 may be prevented with a small number of components, and an increase in cost may be prevented.

The supporting portion 400 has oblique sides 420, and the width thereof becomes gradually narrower from the end 410 toward the hinge portion 300. The supporting portion 400 has a substantially trapezoidal shape adjoining the display-side case 200 in planar view. This substantially trapezoidal shape covers the border between the rotation base portions 310 and the display-side case 200. The supporting portion 400 overhangs the hinge portion 300 from the end 220 of the display-side case 200 and covers the gap formed between the rotation base portions 310 and the display-side case 200. In this embodiment, the display-side case 200 and the supporting portion 400 have an uninterrupted appearance, and the supporting portion 400 covers the border between the rotation base portions 310 and the display-side case 200. Therefore, the aesthetic properties of the mobile terminal device in planar view may be improved.

The supporting portion 400 is formed integrally with the rotation portion 320 forming the hinge portion 300 such that the supporting portion 400 overlaps the rotation portion 320 in planar view. The supporting portion 400 is formed by integrating the substantially trapezoidal shape wider than the rotation portion 320 with the rotation portion 320. A gap is not formed between the rotation portion 320 and the supporting portion 400, and the border between the rotation base portions 310 and the display-side case 200 may be covered with the part of the supporting portion 400 wider than the rotation portion 320.

Since the supporting portion 400 is formed integrally with the rotation portion 320, the display-side case 200 and the supporting portion 400 and the rotation portion 320 are integrally rotated about the axis A1 of rotation. The supporting portion 400 moves along the surface of the rotation base portions 310 and does not interfere with the rotation. Therefore, the operation-side case 100 and the display-side case 200 may be smoothly opened and closed.

Figure 3:
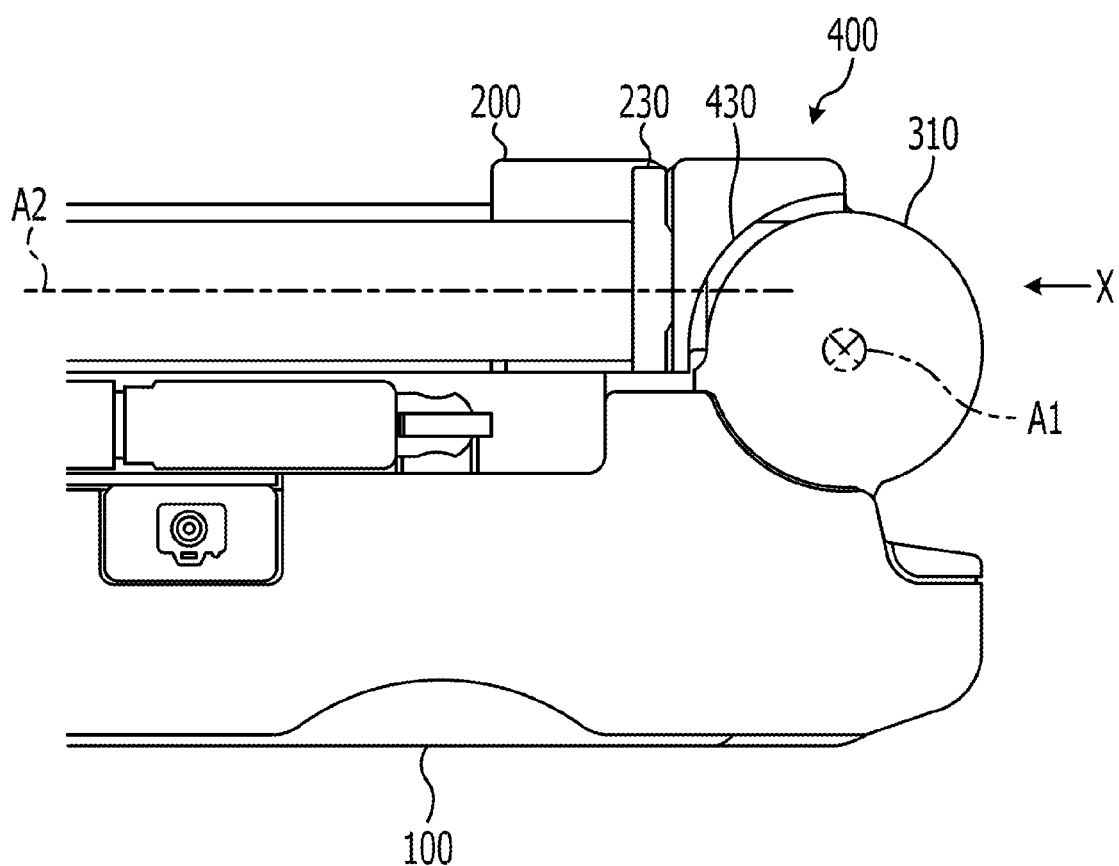
FIG. 3 illustrates the configuration of the vicinity of the hinge portion according to the embodiment.

FIG. 3 illustrates the configuration of the vicinity of the hinge portion according to the embodiment. As illustrated in FIG. 3, the supporting portion 400 has outer wall surfaces 430 having shapes conforming to the surfaces of the rotation base portions 310. The outer wall surfaces 430 of the supporting portion 400 facing the rotation base portions 310 have shapes conforming to the surfaces of the rotation base portions 310 each formed in a substantially cylindrical shape. In FIG. 3, when the supporting portion 400 rotates about the axis A1 of rotation that is substantially the center of the rotation base portions 310, the outer wall surfaces 430 moves along the surfaces of the rotation base portions 310. In FIG. 3, the arc-shaped outer wall surface 430 moves along the circumference illustrating the surface of the rotation base portion 310.

In this embodiment, the border between the rotation base portions 310 and the display-side case 200 is covered by the supporting portion 400, and the supporting portion 400 is moved along the surfaces of the rotation base portions 310. Therefore, the axis A1 of rotation and the axis A2 of rotation are not located in the same plane. As illustrated in FIG. 3, the axis A1 of rotation that is substantially the center of the rotation base portions 310 is located at a position on the operation-side case 100 side of the axis A2 of rotation that is near the middle in the thickness direction of the display-side case 200. Locating the axis A1 of rotation on the operation-side case 100 side of the axis A2 of rotation makes it possible to make the thickness of the display-side case 200 substantially the same as the thickness of the supporting portion 400 and to cause the supporting portion 400 to overhang the rotation base portions 310. The supporting portion 400 overlapping the rotation base portions 310 may be moved along the surfaces of the rotation base portions 310.

In this embodiment, when the supporting portion 400 moves along the surfaces of the rotation base portions 310, the positional relationship between the supporting portion 400 and the display-side case 200 does not change. When the display-side case 200 rotates about the axis A1 of rotation to be opened and closed, the distance between the supporting portion 400 and the display-side case 200 is constant. In this embodiment, since the supporting pads 230 provided in the display-side case 200 are in contact with the supporting portion 400, backlash of the display-side case 200 may be prevented.

In a mobile terminal device not provided with the supporting portion 400, when the operation-side case and the display-side case are opened and closed relative to each other, the distance between the display-side case and the rotation base portions sometimes differs between the closed state and the open state. For this reason, in a mobile terminal device not provided with the supporting portion 400, backlash of the display-side case needs to be prevented by separately providing components such as pads that are in contact with the rotation base portions in each state. In the mobile terminal device in this embodiment, if a pair of supporting pads 230 is provided in the display-side case 200, backlash of the display-side case 200 may be prevented in both the closed state and the open state. Therefore, the mobile terminal device in this embodiment may reduce the number of components for preventing backlash of the display-side case 200 and may prevent an increase in cost.

Figure 4:
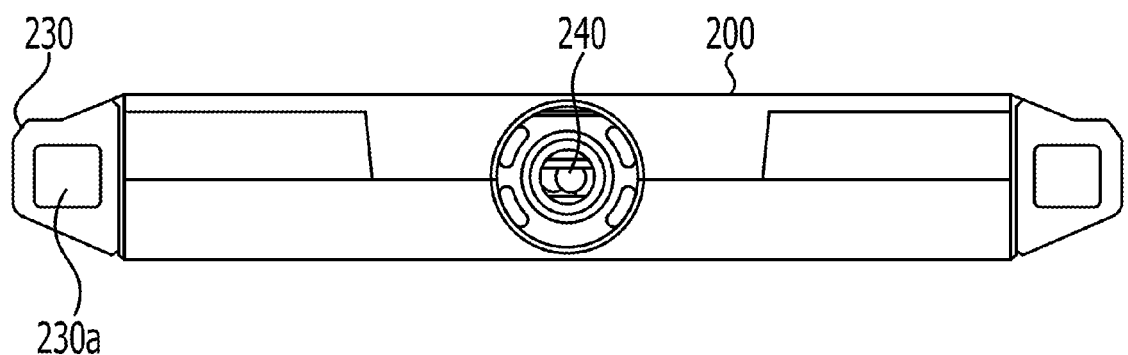
FIG. 4 illustrates a part of the display-side case attached to the supporting portion.

FIG. 4 illustrates a part of the display-side case 200 attached to the supporting portion 400. FIG. 4 illustrates the configuration of the end 220 of the display-side case 200 removed from the supporting portion 400 as viewed from the direction X in FIG. 3. As illustrated in FIG. 4, the supporting pads 230 are provided at both ends of the end 220 of the display-side case 200. In the center of each supporting pad 230, a protrusion 230a is formed.

In the vicinity of the middle of the end 220 of the display-side case 200, a shaft hole 240 corresponding to the axis A2 of rotation is formed. The display-side case 200 is rotatably connected to the supporting portion 400. By bringing the protrusions 230a of the supporting pads 230 into contact with the end 410 of the supporting portion 400, the display-side case 200 is supported and backlash is prevented.

Since the end 220 of the display-side case 200 and the end 410 of the supporting portion 400 have substantially the same width, the protrusions 230a of the supporting pads 230 are always in contact with the end 410 of the supporting portion 400 even if the display-side case 200 and the supporting portion 400 rotate about the axis A1 of rotation. Regardless of the open/closed state of the operation-side case 100 and the display-side case 200, backlash of the display-side case 200 may be prevented with minimum components.

As described above, according to this embodiment, a wide supporting portion is formed integrally with a rotation portion forming a hinge portion that allows the operation-side case and the display-side case to open and close relative to each other. The supporting portion rotatably supports the display-side case and covers the border between the display-side case and rotation base portions forming the hinge portion. For this reason, the gap formed between the display-side case and the rotation base portions are hidden, and the mobile terminal device may have a totally uninterrupted appearance. Even when a mobile terminal device has a case rotatable about at least two axes of rotation, the aesthetic properties thereof may be improved.

In the above-described embodiment, as illustrated in FIG. 2, the supporting portion 400 partially covers the hinge portion 300. However, the supporting portion 400 may cover the entire hinge portion 300. The shape of the supporting portion 400 is not limited to a trapezoidal shape and may be, for example, a rectangular shape. The size and shape of the supporting portion 400 may be changed according to the design of the mobile terminal device.

In the above-described embodiment, a rotation portion 320 interposed between a pair of rotation base portions 310 is formed integrally with the supporting portion 400. However, the rotation portion does not necessarily have to be interposed between a pair of rotation base portions. If the hinge portion has, for example, a structure in which a middle rotation base portion is interposed between a pair of rotation portions, forming the rotation portions integrally with a supporting portion rotatably supporting the display-side case enables the supporting portion to cover the border between the display-side case and the rotation base portion.

The configuration disclosed in the above-described embodiment may be applied not only to mobile phones but also, for example, to PDAs (Personal Digital Assistants), notebook personal computers, and mobile video game machines. That is, the same configuration as the above-described embodiment may be applied to any mobile terminal device in which two cases are openable and closable relative to each other and one of the cases is further rotatable.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that various changes, substitutions, and alterations could be made hereto without departing from the spirit and scope of the invention.

What is claimed is:

1. A mobile terminal device comprising:
a first case including a rotation base portion having a first axis of rotation parallel to a side of the first case;
a second case openable and closable relative to the first case by rotating the second case about the first axis of rotation; and
a supporting portion attached to the second case,
wherein the supporting portion includes a rotation portion integral therewith and rotatable relative to the rotation base portion about the first axis of rotation and covers at least a part of the rotation base portion,
wherein the second case and the supporting portion are rotatable about a second axis of rotation perpendicular to the first axis of rotation,
wherein the supporting portion includes an end having substantially the same width as an end of the second case and connecting to the end of the second case with the second axis of rotation therebetween, and covers at least a part of the rotation base portion formed in a vicinity of the end of the supporting portion,
wherein the second case has a supporting pad protruding from the end of the second case and in contact with the end of the supporting portion, and is supported by the supporting portion with the supporting pad therebetween when not rotating about the second axis of rotation.

2. The mobile terminal device according to claim 1, wherein the supporting portion includes an outer wall surface having a shape conforming to the surface of the rotation base portion which moves along the surface of the rotation base portion with the rotation of the rotation portion.

3. The mobile terminal device according to claim 1, wherein the second axis of rotation is not located in the same plane as the first axis of rotation.

4. The mobile terminal device according to claim 1, wherein the first axis of rotation is parallel to the lateral direction of the second case.

5. The mobile terminal device according to claim 1, wherein the second axis of rotation is parallel to the longitudinal direction of the second case.

* * * * *